US011717883B2

(12) United States Patent
Yoshida

(10) Patent No.: US 11,717,883 B2
(45) Date of Patent: Aug. 8, 2023

(54) METHOD FOR MANUFACTURING CAST STRIP

(71) Applicant: NIPPON STEEL CORPORATION, Tokyo (JP)

(72) Inventor: Naotsugu Yoshida, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 17/278,964

(22) PCT Filed: Oct. 3, 2019

(86) PCT No.: PCT/JP2019/039126
§ 371 (c)(1),
(2) Date: Mar. 23, 2021

(87) PCT Pub. No.: WO2020/071488
PCT Pub. Date: Apr. 9, 2020

(65) Prior Publication Data
US 2022/0023936 A1 Jan. 27, 2022

(30) Foreign Application Priority Data
Oct. 3, 2018 (JP) ................. 2018-188404

(51) Int. Cl.
*B22D 11/108* (2006.01)
*B22D 11/06* (2006.01)

(52) U.S. Cl.
CPC ........ *B22D 11/108* (2013.01); *B22D 11/0622* (2013.01); *B22D 11/0682* (2013.01)

(58) Field of Classification Search
CPC ............ B22D 11/0622; B22D 11/0682; B22D 11/108

See application file for complete search history.

(56) References Cited

U.S. PATENT DOCUMENTS

| 5,488,988 A | 2/1996 | Fukase et al. |
| 2012/0235314 A1* | 9/2012 | Kweon .............. B22D 11/0535 425/150 |

FOREIGN PATENT DOCUMENTS

| JP | 57-160553 A | 10/1982 |
| JP | 60-184450 A | 9/1985 |
| JP | 63-242447 A | 10/1988 |
| JP | 5-237603 A | 9/1993 |
| JP | 6-182514 A | 7/1994 |
| JP | 7-132350 A | 5/1995 |
| JP | 10-180423 A | 7/1998 |
| JP | 2017-196640 A | 11/2017 |

* cited by examiner

*Primary Examiner* — Kevin E Yoon
*Assistant Examiner* — Jacky Yuen
(74) *Attorney, Agent, or Firm* — Birch, Stewart, Kolasch & Birch, LLP

(57) ABSTRACT

There is provided a cast strip manufacturing method including: supplying a molten steel stored in a tundish (18) to a molten steel pool portion (16) formed by a pair of rotating cooling rolls (11) and a pair of side dams via an immersion nozzle (20); and forming and growing a solidified shell on a circumferential surface of the cooling roll (11) to manufacture a cast strip (1), in which a Si additive is added to the molten steel in the tundish (18), a Si concentration of the molten steel is adjusted to be within a fixed range, and a temperature of the molten steel in the tundish (18) is controlled to be within a fixed range.

3 Claims, 2 Drawing Sheets

METHOD FOR MANUFACTURING CAST STRIP

TECHNICAL FIELD OF THE INVENTION

The present invention relates to a cast strip manufacturing method including supplying a molten steel to a molten steel pool portion formed by a pair of rotating cooling rolls and a pair of side dams via an immersion nozzle, and forming and growing a solidified shell on a circumferential surface of the cooling roll to manufacture a cast strip.

Priority is claimed on Japanese Patent Application No. 2018-188404, filed Oct. 3, 2018, the content of which is incorporated herein by reference.

RELATED ART

As a method for manufacturing a cast strip of steel, what is provided is, for example, a twin-roll caster including a pair of cooling rolls which have a water cooling structure inside and are rotated in mutually opposite directions, in which a molten steel is supplied to a molten steel pool portion formed by the pair of rotating cooling rolls and a plurality of refractory walls, a solidified shell is formed and grown on a circumferential surface of the cooling roll, and the solidified shells respectively formed on the outer circumferential surfaces of the pair of cooling rolls are pressure bonded at a roll kiss point to manufacture a cast strip having a predetermined thickness, as shown in Patent Documents 1 to 3.

Regarding a cast strip manufactured using the twin-roll caster, the molten steel is rapidly cooled at the time of solidification, and thus columnar crystals are formed from surface layers of both sides toward a ½-thick portion. In addition, in some cases, a grown tip end portion of the solidified shell is broken into a solidified piece by a pressing force of the cooling roll, the solidified piece stays in the molten steel pool portion and is taken in between the solidified shells formed of the columnar crystals, and whereby an equiaxed crystal zone is formed in the ½-thick portion.

PRIOR ART DOCUMENT

Patent Document

[Patent Document 1] Japanese Unexamined Patent Application, First Publication No. S60-184450
[Patent Document 2] Japanese Unexamined Patent Application, First Publication No. H05-237603
[Patent Document 3] Japanese Unexamined Patent Application, First Publication No. H10-180423

DISCLOSURE OF THE INVENTION

Problems to be Solved by the Invention

Here, an equiaxed crystal ratio is defined as a ratio of a thickness of the equiaxed crystal zone to an overall thickness of the cast slab. It is important to set an appropriate equiaxed crystal ratio in order to obtain a cast strip with few center defects and reliable internal quality. In a case where the equiaxed crystal ratio is 0%, that is, the solidified sheet is formed only of columnar crystals, porosity and center segregation tend to occur in the ½-thick portion.

The equiaxed crystal ratio is known to be related to a molten steel temperature. Table 1 shows an example of the relationship between an equiaxed crystal ratio and a degree of superheat $\Delta T$ of the molten steel in a tundish in a low carbon steel.

TABLE 1

| Degree of Superheat $\Delta T$ of Molten Steel | Equiaxed Crystal Ratio |
| --- | --- |
| lower than 30° C. | 0.15 to 0.40 |
| 30° C. to lower than 50° C. | 0.05 to 0.20 |
| 50° C. to lower than 60° C. | 0 to 0.05 |
| 60° C. or higher | 0 |

As shown in Table 1, in order to increase the equiaxed crystal ratio, it is effective to reduce the molten steel temperature in the tundish. In addition, in a case where the molten steel temperature fluctuates during casting, the equiaxed crystal ratio in the cast strip also changes, and thus there is a concern that the cast structure may not be stabilized in a longitudinal direction of the cast strip and defects may occur.

In the above-described twin-roll caster, for example, at the initial stage of casting, the heat is transferred to the refractory material such as the tundish, and the molten steel temperature drops. The molten steel temperature rises at steady state, but tends to drop again at the final stage of casting.

Strictly speaking, the equiaxed crystal ratio is influenced by the temperature of the molten steel pool portion described above, but since it is generally difficult to measure the temperature of the molten steel pool portion, it is controlled by the molten steel temperature in the tundish. Since the amount of temperature reduction occurring due to the supply of the molten steel from the tundish to the molten steel pool portion is almost constant depending on the individual continuous casting apparatus, the relationship between the molten steel temperature in the tundish and the equiaxed crystal ratio is as shown in Table 1.

Here, in a case where the set temperature of the molten steel in the tundish is reduced in order to improve the equiaxed crystal ratio, the molten steel temperature is excessively reduced at the initial stage and the final stage of casting, and thus there is a concern that troubles such as the clogging of an immersion nozzle may occur. Furthermore, there is a concern that stuck metals may grow a lot and be attached to the cast strip, and a hot band or the like may occur.

In a case where the set temperature of the molten steel is increased in order to suppress the occurrence of casting troubles at the initial stage and the final stage of casting, the molten steel temperature is excessively increased at steady state, and thus there is a concern that the equiaxed crystal ratio may be reduced.

It is also conceivable to dispose a heater or the like in order to maintain the molten steel temperature in the tundish within a fixed range. However, in a case where the molten steel temperature in the tundish is adjusted by the heater, a time lag occurs in the adjustment of the temperature, and it is difficult to accurately control the molten steel temperature.

The invention is contrived in view of the above-described circumstances, and an object thereof is to provide a cast strip manufacturing method in which by controlling a molten steel temperature in a tundish within a fixed range, a molten steel temperature in a molten steel pool portion is controlled to be within a fixed range, and it is possible to manufacture a cast strip having a stabilized equiaxed crystal ratio in a longitudinal direction.

Means for Solving the Problem

In order to solve the above problems, a cast strip manufacturing method according to the invention includes: supplying a molten steel stored in a tundish to a molten steel pool portion formed by a pair of rotating cooling rolls and a pair of side dams via an immersion nozzle; and forming and growing a solidified shell on a circumferential surface of the cooling roll to manufacture a cast strip, a Si additive is added to the molten steel in the tundish from an initial stage to a final stage of casting, a Si concentration of the molten steel is adjusted to be within a fixed range, and a temperature of the molten steel in the tundish is controlled to be within a fixed range.

According to the cast strip manufacturing method having the above configuration, by adding a Si additive containing Si, which generates heat in dissolving in Fe, to the molten steel in the tundish, the Si concentration of the molten steel is adjusted to be within a fixed range and the temperature of the molten steel in the tundish is controlled to be within a fixed range, whereby the molten steel temperature can be accurately controlled so that it is possible to manufacture a cast strip having a stabilized equiaxed crystal ratio in a longitudinal direction.

In addition, even at the initial stage and the final stage of casting in which the molten steel temperature is reduced, the molten steel temperature can be increased by adding the Si additive, and thus it is possible to suppress the occurrence of troubles such as the clogging of the immersion nozzle, and casting can be stably performed. Accordingly, the molten steel temperature at steady state can be set low, and it is possible to manufacture a cast strip having a target equiaxed crystal ratio.

Here, in the cast strip manufacturing method according to the invention, it is preferable that a plurality of Si-containing materials having different Si contents are prepared, and to the molten steel in the tundish, a single Si-containing material or a plurality of the Si-containing materials of which a blending ratio is adjusted are added as the Si additive.

In this case, by adjusting the blending ratio of a plurality of the Si-containing materials having different Si contents and adding the Si-containing materials to the molten steel in the tundish, the Si concentration of the molten steel can be relatively easily adjusted to be within a fixed range, and the molten steel temperature in the tundish can be controlled to be within a fixed range, whereby the temperature of the molten steel in the molten steel pool portion can be controlled to be within a fixed range.

Here, in the cast strip manufacturing method according to the invention, an addition rate of the Si additive is adjusted according to the blending ratio of the single Si-containing material or the plurality of the Si-containing materials, and thus the Si concentration of the molten steel can be adjusted to be within a fixed range.

Here, in the cast strip manufacturing method according to the invention, the Si additive may be added to the molten steel in the tundish after being heated to a temperature exceeding room temperature, and in this case, the molten steel temperature can be efficiently increased.

Effects of the Invention

As described above, according to the invention, it is possible to provide a cast strip manufacturing method in which by controlling a molten steel temperature in a tundish within a fixed range, a molten steel temperature in a molten steel pool portion is controlled to be within a fixed range, and it is possible to manufacture a cast strip having a stabilized equiaxed crystal ratio in a longitudinal direction.

EMBODIMENTS OF THE INVENTION

Hereinafter, a cast strip manufacturing method according to an embodiment of the invention will be described with reference to the accompanying drawings. The invention is not limited to the following embodiments. In the following embodiments and examples, a Si-containing material and a Si additive are used at room temperature or at 25° C.

A cast strip 1 manufactured in this embodiment is, for example, a Si-containing steel containing Si within a range of 0.5 mass % to 8.0 mass %.

In this embodiment, the cast strip 1 to be manufactured has a width within a range of 200 mm to 1,800 mm, and a thickness within a range of 0.8 mm to 5 mm.

Next, a twin-roll caster 10 according to this embodiment will be described.

Figure 1:
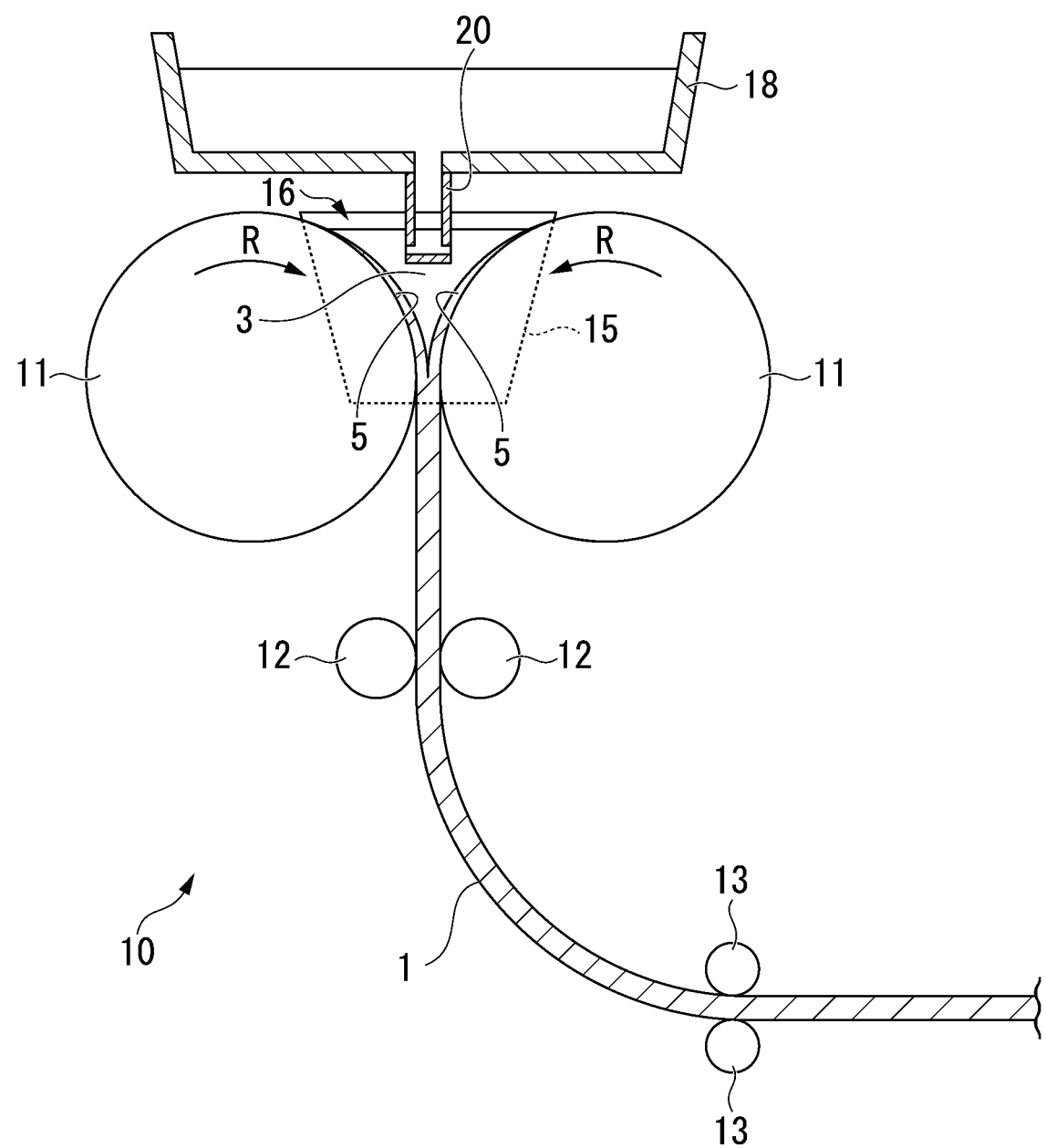
FIG. 1 is an explanatory diagram showing an example of a twin-roll caster that implements a cast strip manufacturing method according to an embodiment of the invention.

The twin-roll caster 10 shown in FIG. 1 includes a pair of cooling rolls 11, pinch rolls 12 and 13 supporting the cast strip 1, a side dam 15 disposed at an end portion in a width direction of the pair of cooling rolls 11, a tundish 18 holding a molten steel 3 that is supplied to a molten steel pool portion 16 formed of the pair of cooling rolls 11 and the side dam 15, and an immersion nozzle 20 supplying the molten steel 3 stored in the tundish 18 to the molten steel pool portion 16.

In the twin-roll caster 10, a molten steel 3 is supplied from the tundish 18 to the molten steel pool portion 16 via the immersion nozzle 20. In the molten steel pool portion 16, the molten steel 3 is brought into contact with the rotating cooling rolls 11 and cooled, and thus solidified shells 5 grow on circumferential surfaces of the cooling rolls 11. The solidified shells 5 formed on the pair of cooling rolls 11, respectively, are pressure bonded at a roll kiss point to cast a cast strip 1 having a predetermined thickness.

In a case where casting is performed using the above-described twin-roll caster 10, the refractory material constituting the tundish 18 and the like has a low temperature at the initial stage of casting, and thus the heat of the molten steel 3 is transferred to the refractory material, and the molten steel temperature tends to drop. Also, the molten steel temperature tends to drop by changes with the passage of time at the final stage of casting. That is, usually, in a case where casting is performed using the above-described twin-roll caster 10, the molten steel temperature is low at the initial stage of casting, high at steady state, and low at the final stage of casting.

In the above-described twin-roll caster 10, the molten steel 3 in the tundish 18 is supplied to the molten steel pool portion 16 by using the immersion nozzle 20, but in a case where the molten steel temperature is reduced, the immersion nozzle 20 is clogged, and it is difficult to stably perform the casting.

In addition, in the above-described twin-roll caster 10, since the side dam 15 is always in sliding contact with the cooling roll 11, the heat is removed from the cooling roll 11, and the side dam is cooled. Accordingly, stuck metals are likely to be generated on the surface of the side dam 15. In a case where the molten steel temperature is reduced at the initial stage and the final stage of casting, stuck metals are more likely to be generated, and in a case where the stuck metals are attached to the cast strip 1 in a state of being grown a lot, a hot band or the like occurs, and casting cannot be stably performed.

Furthermore, in a case where the molten steel temperature fluctuates, the equiaxed crystal ratio changes, and the structure is unstable in a longitudinal direction.

Accordingly, in the cast strip manufacturing method according to this embodiment, a Si additive is added to the molten steel 3 in the tundish 18, and the generation of heat during dissolving of Si in Fe is used to control the molten steel temperature.

In this case, it is necessary to adjust the amount of the Si additive to be added so that the Si concentration of the molten steel 3 is within a target range.

That is, in the cast strip manufacturing method according to this embodiment, by adding a Si additive to the molten steel 3 in the tundish 18, the Si concentration of the molten steel 3 is adjusted to be within a fixed range, and the molten steel temperature in the tundish 18 is controlled to be within a fixed range, whereby the molten steel temperature in the molten steel pool portion 16 is controlled to be within a fixed range.

Specifically, the Si concentration of the molten steel 3 supplied to the tundish 18 is set to be lower than a target Si concentration of the product. In this embodiment, a difference between the Si concentration of the molten steel 3 supplied to the tundish 18 and the target Si concentration of the product is preferably within a range of 0.5 mass % to 1.0 mass %.

This is because, in a case where the difference between the Si concentration of the molten steel 3 supplied to the tundish 18 and the target Si concentration of the product is less than 0.5 mass %, the amount of Si added is small, the amount of temperature increase is too small, and thus the effects of the invention cannot be actually achieved. In addition, this is because, in a case where the difference between the Si concentration of the molten steel 3 supplied to the tundish 18 and the target Si concentration of the product is greater than 1.0 mass %, the amount of Si added is too large, and thus there is a concern that the adjustment accuracy of the concentration and the temperature may be reduced.

The amount of the Si additive to be added is specified by the following expressions. The symbols in Expressions (1) to (4) and (4a) are defined as follows.

m(i): Blending of Si-containing material i in Si additive (mass %).
C(i): Si content (mass %) of Si-containing material i.
$Q_m$: Molten steel throughput (kg/min).
$Q_s$: Addition rate (kg/min) of Si additive.
ΔC: Difference (mass %) in Si concentration insufficient with respect to target Si concentration.
ΔTj: Difference (° C.) in temperature insufficient with respect to target molten steel temperature.
ΔQ(i): Addition ratio (mass %) based on molten steel required for increasing Si concentration by 1 mass % by singly adding Si-containing material i.
ΔT(i): Amount of molten steel temperature increase (° C.) in case where Si concentration is increased by 1 mass % by singly adding Si-containing material i.

ΔT'(i, Tpi): Amount of molten steel temperature increase (° C.) in case where Si concentration is increased by 1 mass % by singly adding Si-containing material i heated to temperature Tpi.

$$\sum_i (m(i)) = 100 \quad (1)$$

$$\Delta Q(i) = \frac{100}{C(i)} \quad (2)$$

$$100 \times \frac{Q_s}{Q_m} = \Delta C \times \sum_i \left( \frac{m(i)}{100} \times \Delta Q(i) \right) \quad (3)$$

$$\Delta Tj = \Delta C \times \sum_i \left( \frac{m(l)}{100} \times \Delta T(i) \right) \quad (4)$$

$$\Delta Tj = \Delta C \times \sum_i \left( \frac{m(i)}{100} \times \Delta T'(i, T_{Pi}) \right) \quad (4a)$$

Here, Expression (3) is an expression in which the Si concentration in the molten steel 3 is adjusted, and Expression (4) is an expression in which the molten steel temperature is controlled. Expression (4a) is an expression in which ΔT in Expression (4) is replaced with ΔT'(i, Tpi) and the molten steel temperature is controlled in a case where a heated Si additive is used.

In addition, in this embodiment, a plurality of types of Si-containing materials having different Si contents are used as the Si additive, and the subscript i corresponds to each Si-containing material.

Furthermore, since the difference from the target molten steel temperature changes depending on the casting period, the subscript j corresponds to the casting period.

By adding the Si additive to the molten steel 3 in the tundish 18 so as to satisfy Expression (3) and Expression (4) (or Expression (4a)), the Si concentration of the molten steel 3 is adjusted to be within a fixed range, and the molten steel temperature in the tundish 18 is controlled to be within a fixed range, whereby the molten steel temperature in the molten steel pool portion 16 can be controlled to be within a fixed range.

In a case where the Si additive is added to the molten steel 3 in the tundish 18, the addition rate $Q_s$ of the Si additive is adjusted according to the blending ratio of the plurality of Si-containing materials i. Specifically, the addition rate $Q_s$ (kg/min) of the Si additive is adjusted according to the molten steel throughput $Q_m$ (kg/min), the difference in Si concentration ΔC (mass %) insufficient with respect to the target Si concentration of the molten steel 3, the blending m(i) (mass %) of the Si-containing materials i in the Si additive, and the addition ratio ΔQ(i) (mass %) based on the molten steel required for increasing the Si concentration by 1 mass % by singly adding the Si-containing material i so as to satisfy Expression (3). Therefore, the Si concentration of the molten steel 3 can be adjusted to be within a fixed range even in a case where the Si additive to be added is formed of a plurality of Si-containing materials having different blending m(i) (mass %) of the Si-containing materials i in the Si additive and the blending ratio of the Si-containing materials varies depending on the casting period.

In a case where the Si additive is added to the molten steel 3 in the tundish 18, the Si additive may be added after being heated to a temperature exceeding room temperature. In this case, for each type of Si-containing material, how much the molten steel temperature per addition amount rises as what degree the Si-containing material is heated to, that is, the amount of molten steel temperature increase (° C.) in a case where the Si concentration is increased by 1 mass % by singly adding a unit amount of Si-containing material i heated may be set in advance by an experiment, computer simulation, or the like.

Here, metallic Si or ferrosilicon is preferably used as the Si-containing material constituting the Si additive. As the ferrosilicon, ferrosilicon specified in the Japanese Industrial Standard JIS 2302-1998, or ferrosilicon specified in the International Standard ISO 5445-1980 may be used.

As the metallic Si, metallic Si having a purity of 95 mass % or greater is preferably used.

The ferrosilicon preferably has a Si content of 40 mass % or greater since a Si content of less than 40 mass % is ineffective in increasing the temperature of the molten steel 3.

Ferrosilicon having a Si content of less than 40 mass % can be used in reducing the molten steel temperature or in increasing the Si concentration without changing the molten steel temperature.

In this embodiment, for example, metallic Si, ferrosilicon No. 2, and ferrosilicon No. 3 are used as the Si-containing material.

Regarding the metallic Si (purity 99 mass %), in a case where it is singly added to increase the Si concentration of the molten steel by 1 mass %, the addition ratio is 1.00 mass %, and the amount of molten steel temperature increase is +31° C.

Regarding the ferrosilicon No. 2 (Si content 75 mass %), in a case where it is singly added to increase the Si concentration of the molten steel by 1 mass %, the addition ratio is 1.33 mass %, and the amount of molten steel temperature increase is +19° C. The ferrosilicon No. 2 is ferrosilicon specified by the chemical composition of Si: 75 to 80 mass %, C: 0.2 mass % or less, P: 0.05 mass % or less, and S: 0.02 mass % or less in Japanese Industrial Standard JIS 2302-1998.

Regarding the ferrosilicon No. 3 (Si content 40 mass %), in a case where it is singly added to increase the Si concentration of the molten steel by 1 mass %, the addition ratio is 2.50 mass %, and the amount of molten steel temperature increase is +3° C. The ferrosilicon No. 3 is ferrosilicon specified by the chemical composition of Si: 40 to 45 mass %, C: 0.2 mass % or less, P: 0.05 mass % or less, and S: 0.02 mass % or less in Japanese Industrial Standard JIS 2302-1998.

As described above, since the amount of molten steel temperature increase (° C.) when the Si concentration is increased by 1 mass % changes depending on the Si content in the Si-containing material, the Si concentration of the molten steel 3 and the molten steel temperature can be adjusted by adjusting the blending ratio of the Si-containing materials in the Si additive.

Figure 2:
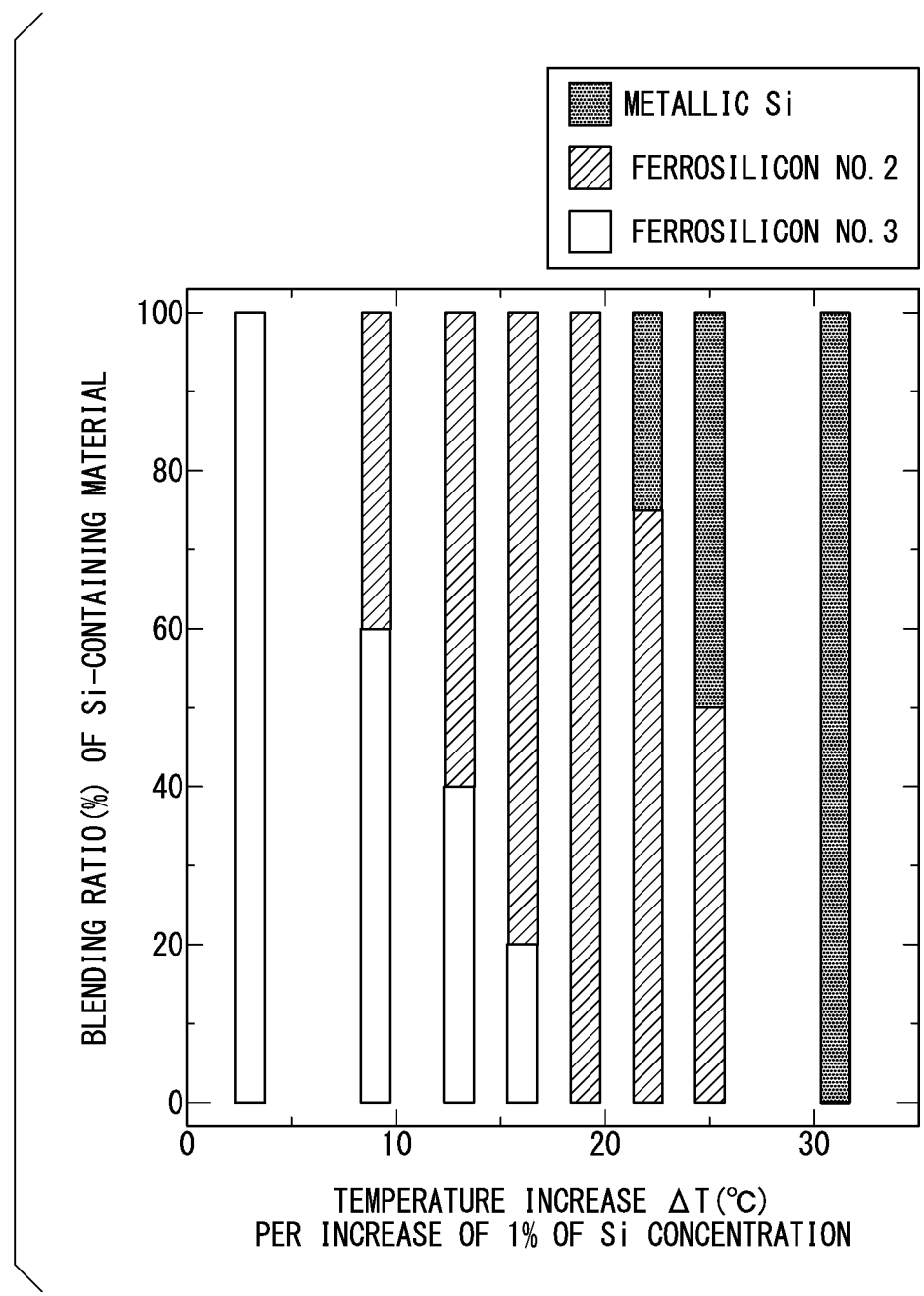
FIG. 2 is an explanatory diagram showing results of adjusting the blending ratio of a plurality of Si-containing materials in an embodiment of the invention.

FIG. 2 shows an example of the relationship between the blending ratio and the amount of molten steel temperature increase (° C.) when the Si concentration is increased by 1 mass %. It is confirmed that the molten steel temperature can be optionally controlled by selecting the blending ratio of a plurality of Si-containing materials.

It is desirable that the molten steel temperature is continuously measured by a thermocouple disposed on a wall surface of the tundish 18. Alternatively, a consumable temperature measuring probe may be inserted from above the tundish 18 to intermittently measure the temperature.

In addition, in a case where the casting conditions such as the capacity of the tundish 18 and the molten steel throughput are fixed, a change in the molten steel temperature in a case where no Si additive is added may be obtained in advance, and the temperature may be measured by the temperature measuring probe only at the initial stage of casting.

According to the cast strip manufacturing method according to this embodiment configured as described above, by adding the Si additive to the molten steel 3 in the tundish 18 from the initial stage to final stage of casting, the Si concentration of the molten steel 3 is adjusted to be within a fixed range and the temperature of the molten steel 3 in the tundish 18 is controlled to be within a fixed range, whereby the molten steel temperature can be accurately controlled so that it is possible to manufacture a cast strip having a stabilized equiaxed crystal ratio in a longitudinal direction.

In addition, the molten steel temperature can be set low to promote the formation of equiaxed crystals, and even at the initial stage and the final stage of casting in which the molten steel temperature is reduced, the molten steel temperature can be increased by adding the Si additive. Accordingly, it is possible to suppress the occurrence of troubles such as the clogging of the immersion nozzle and the occurrence of a hot band due to the sticking of metals, and casting can be stably performed.

In a preferable aspect of this embodiment, a plurality of Si-containing materials having different Si contents are prepared, and to the molten steel 3 in the tundish 18, a single Si-containing material or a plurality of the Si-containing materials of which a blending ratio is adjusted are added as the Si additive. Accordingly, the Si concentration of the molten steel 3 can be relatively easily adjusted to be within a fixed range, and the temperature of the molten steel 3 in the molten steel pool portion 16 can be controlled to be within a fixed range.

In a preferable embodiment of this embodiment, the addition rate of the Si additive may be adjusted according to the blending ratio of the plurality of Si-containing materials. Accordingly, in this case, the Si concentration of the molten steel 3 can be adjusted to be within a fixed range.

In a preferable embodiment of this embodiment, in a case where a Si-containing material such as ferrosilicon is added as the Si additive to the molten steel 3 in the tundish 18, the Si additive is added after being heated to a temperature exceeding room temperature. Accordingly, the molten steel temperature can be efficiently increased.

Although the cast strip manufacturing method according to the embodiment of the invention has been described in detail as above, the invention is not limited thereto, and can be appropriately changed without departing from the technical idea of the invention.

For example, in the description of this embodiment, the twin-roll caster in which the pinch rolls are disposed as shown in FIG. 1 has been described as an example, but the arrangement of the rolls and the like is not limited, and the design may be appropriately changed.

Although it has been described that metallic Si, ferrosilicon No. 2, and ferrosilicon No. 3 are used as the Si-containing material, other Si-containing materials may be used.

EXAMPLES

Results of experiments performed to confirm the effects of the invention will be described below.

Using a twin-roll caster having the configuration shown in FIG. 1, a cast strip made of a carbon steel with a composition in which a target Si concentration was 0.80 mass % was cast.

The cast strip had a size of 2 mm thickness×800 mm width. The casting amount was 10 tons, the casting rate was 50 m/min, and the casting time was 18 minutes.

Invention Examples

In invention examples, a Si concentration of the molten steel supplied to the tundish was 0.10 mass %, and a difference in Si concentration $\Delta C$ insufficient with respect to a target Si concentration was 0.70 mass %.

Using 3 types of Si-containing materials shown in Table 2, a Si additive was added to the molten steel in the tundish as shown in Table 3. The molten steel temperature was adjusted so that a degree of superheat $\Delta T$ in the tundish was within an appropriate range (30° C. to 50° C.).

The structure of the cast strip obtained was observed, and an equiaxed crystal ratio was measured. The measured equiaxed crystal ratio is shown together in Table 3.

Here, regarding the blending of the Si-containing materials in Table 3, the selection of materials and the calculation method of the blending amount will be described below.

First, a maximum value of temperature increase is determined by the difference in Si concentration $\Delta C$ insufficient with respect to the target Si concentration. A maximum amount of temperature increase $\Delta T_{maxi}$ for each Si-containing material is determined by the following expression based on Table 2.

$\Delta T_{max1} = 31 \times \Delta C$ $\Delta T_{max2} = 19 \times \Delta C$ $\Delta T_{max3} = 3 \times \Delta C$ Accordingly, the Si-containing materials may be selected according to the insufficient temperature difference $\Delta Tj$.

That is, in a case where Expression: $19 \times \Delta C \leq \Delta Tj \leq 31 \times \Delta C$ is satisfied, ferrosilicon No. 2 (Si content 75 mass %) and metallic Si are used. In addition, in a case where Expression: $3 \times \Delta C \leq \Delta Tj \leq 19 \times \Delta C$ is satisfied, ferrosilicon No. 2 (Si content 75 mass %) and ferrosilicon No. 3 (Si content 40 mass %) are used.

For example, in a case where $\Delta C = 0.70$ mass % and the insufficient temperature difference $\Delta Tj$ is 10° C., $3 \times 0.70 < 10 < 19 \times 0.70$ is obtained, and thus ferrosilicon No. 2 and ferrosilicon No. 3 may be selected.

The required amount of each Si-containing material to be supplied is calculated by Expressions (1) to (4).

Expression (5) is calculated from Expression (3).

$$100 \times \frac{Q_s}{Q_m} = 0.70 \times \left\{ \frac{m(2)}{100} \times 1.33 + \frac{m(3)}{100} \times 2.50 \right\} \quad (5)$$

Expression (6) is calculated from Expression (4).

$$10 = 0.70 \times \left\{ \frac{m(2)}{100} \times 19 + \frac{m(3)}{100} \times 3 \right\} \quad (6)$$

Here, since $m(2) + m(3) = 100$ is obtained from Expression (1), $m(2) \approx 70$ and $m(3) \approx 30$ are obtained. In a case where these are substituted into Expression (5), the right side is 1.18.

In a case of molten steel throughput $Q_m = 584$ kg/min, $Q_s = 6.8$ kg/min is obtained.

TABLE 2

| i | Si-Containing Material | Si Content C(i) | Amount of Molten Steel Temperature Increase $\Delta T(i)$ in Case Where Si Concentration is Increased by 1 mass % | Addition Ratio $\Delta Q(i)$ Required for Increasing Si Concentration by 1 mass % |
|---|---|---|---|---|
| 1 | Metallic Si | 99 mass % or greater | +31° C. | 1.00 mass % |
| 2 | Ferrosilicon No. 2 | 75 mass % | +19° C. | 1.33 mass % |
| 3 | Ferrosilicon No. 3 | 40 mass % | +3° C. | 2.50 mass % |

TABLE 3

| | Casting Period j | Insufficient Temperature Difference $\Delta Tj$ | Ratio of Si-Containing Material | | | Addition Rate of Si Additive | Molten Steel Temperature Increase | Equiaxed Crystal Ratio |
|---|---|---|---|---|---|---|---|---|
| | | | 1 | 2 | 3 | | | |
| I | Start of Casting to 2 min | 20° C. to 25° C. | 100 | 0 | 0 | 4.1 kg/min | +22° C. | 0.18 |
| II | 2 to 5 min | −5° C. to 5° C. | 0 | 0 | 100 | 10.2 kg/min | +2° C. | 0.05 |
| III | 5 to 10 min | 5° C. to 15° C. | 0 | 70 | 30 | 6.8 kg/min | +10° C. | 0.11 |
| IV | 10 to 15 min | 15° C. to 20° C. | 45 | 55 | 0 | 4.8 kg/min | +17° C. | 0.15 |
| V | 15 to 18 min | 20° C. to 25° C. | 100 | 0 | 0 | 4.1 kg/min | +22° C. | 0.20 |

In the invention examples, due to the addition of the Si additive, the molten steel temperature was controlled to be within a fixed range from the initial stage to the final stage of casting, and the equiaxed crystal ratio was stable within a range of 0.05 to 0.20.

In addition, it was possible to stably perform the casting without the clogging of the immersion nozzle, the occurrence of a hot band due to the sticking of metals, and the like.

Comparative Example 1

In Comparative Example 1, the Si concentration of the molten steel supplied to the tundish was adjusted to a target value of 0.80 mass %, and the molten steel temperature was set so that the degree of superheat ΔT in the tundish at steady state (5 minutes after the start of casting) was 40° C.

In Comparative Example 1, in a case where the molten steel was supplied to the tundish at the initial stage of casting, the heat was transferred to the refractory material of the tundish, and the molten steel temperature was reduced by about 20° C. to 40° C. as compared to the case at steady state. Accordingly, stuck metals were generated, and surface defects and a hot band were generated. Even at the final stage of casting, the molten steel temperature was reduced by about 20° C. to 40° C. as compared with the case at steady state. Stuck metals were generated, and surface defects and a hot band were generated.

Comparative Example 2

In Comparative Example 2, the Si concentration of the molten steel supplied to the tundish was adjusted to a target value of 0.80 mass %, and the molten steel temperature was set so that the degree of superheat ΔT in the tundish at steady state (5 minutes after the start of casting) was 60° C.

In Comparative Example 2, it was possible to suppress the occurrence of casting troubles at the initial stage and the final stage of casting. However, the degree of superheat ΔT at steady state was high, and equiaxed crystals were not sufficiently formed. Accordingly, it was not possible to obtain a cast strip having a target equiaxed crystal ratio within a range of 0.05 to 0.2, and center defects such as porosity occurred in the ½-thick portion.

From the above results, according to the invention, it has been confirmed that the Si concentration of the molten steel can be adjusted to be within a fixed range, and the temperature of the molten steel in the molten steel pool portion can be controlled to be within a fixed range, whereby it is possible to manufacture a cast strip having a stabilized equiaxed crystal ratio in a longitudinal direction. In addition, it was possible to suppress the occurrence of casting troubles, and stably perform the casting.

INDUSTRIAL APPLICABILITY

According to the invention, the invention can be applied to a cast strip manufacturing method in which by controlling a molten steel temperature in a tundish within a fixed range, a molten steel temperature in a molten steel pool portion is controlled to be within a fixed range, and it is possible to manufacture a cast strip having a stabilized equiaxed crystal ratio in a longitudinal direction.

BRIEF DESCRIPTION OF THE REFERENCE SYMBOLS

1: cast strip
3: molten steel
5: solidified shell
10: twin-roll caster
11: cooling roll
15: side dam
16: molten steel pool portion
18: tundish

What is claimed is:

1. A cast strip manufacturing method comprising:
supplying a molten steel stored in a tundish to a molten steel pool portion formed by a pair of rotating cooling rolls and a pair of side dams via an immersion nozzle; and
forming and growing a solidified shell on a circumferential surface of the cooling roll to manufacture a cast strip,
wherein a Si additive is added to the molten steel in the tundish, a Si concentration of the molten steel is adjusted to be within a fixed range, and a temperature of the molten steel in the tundish is controlled to be within a fixed range,
wherein a plurality of Si-containing materials having different Si contents are prepared,
and to the molten steel in the tundish, a single Si-containing material or a plurality of the Si-containing materials of which a blending ratio is adjusted are added as the Si additive, and
wherein a difference between a Si concentration of the molten steel supplied to the tundish and a target Si concentration of the cast strip is set within a range of 0.5 mass % to 1.0 mass %,
wherein an addition rate of the Si additive is adjusted according to the blending ratio of the plurality of Si-containing materials so as to satisfy Expression (3), $$100 \times \frac{Q_s}{Q_m} = \Delta C \times \sum_i \left( \frac{m(i)}{100} \times \Delta Q(i) \right) \tag{3}$$

where
$Q_s$: Addition rate (kg/min) of Si additive,
$Q_m$: Molten steel throughput (kg/min),
$\Delta C$: Difference (mass %) in Si concentration insufficient with respect to target Si concentration,
$m(i)$: Blending of Si-containing material "i" in Si additive (mass %), and
$\Delta Q(i)$: Addition ratio (mass %) based on molten steel required for increasing Si concentration by 1 mass % by singly adding Si-containing material "i".

2. The cast strip manufacturing method according to claim 1,
wherein the Si additive is added to the molten steel in the tundish after being heated to a temperature exceeding room temperature.

3. The cast strip manufacturing method according to claim 1,
wherein the Si additive is added to the molten steel in the tundish after being heated to a temperature exceeding room temperature.

* * * * *